United States Patent Office 3,427,473
Patented Feb. 11, 1969

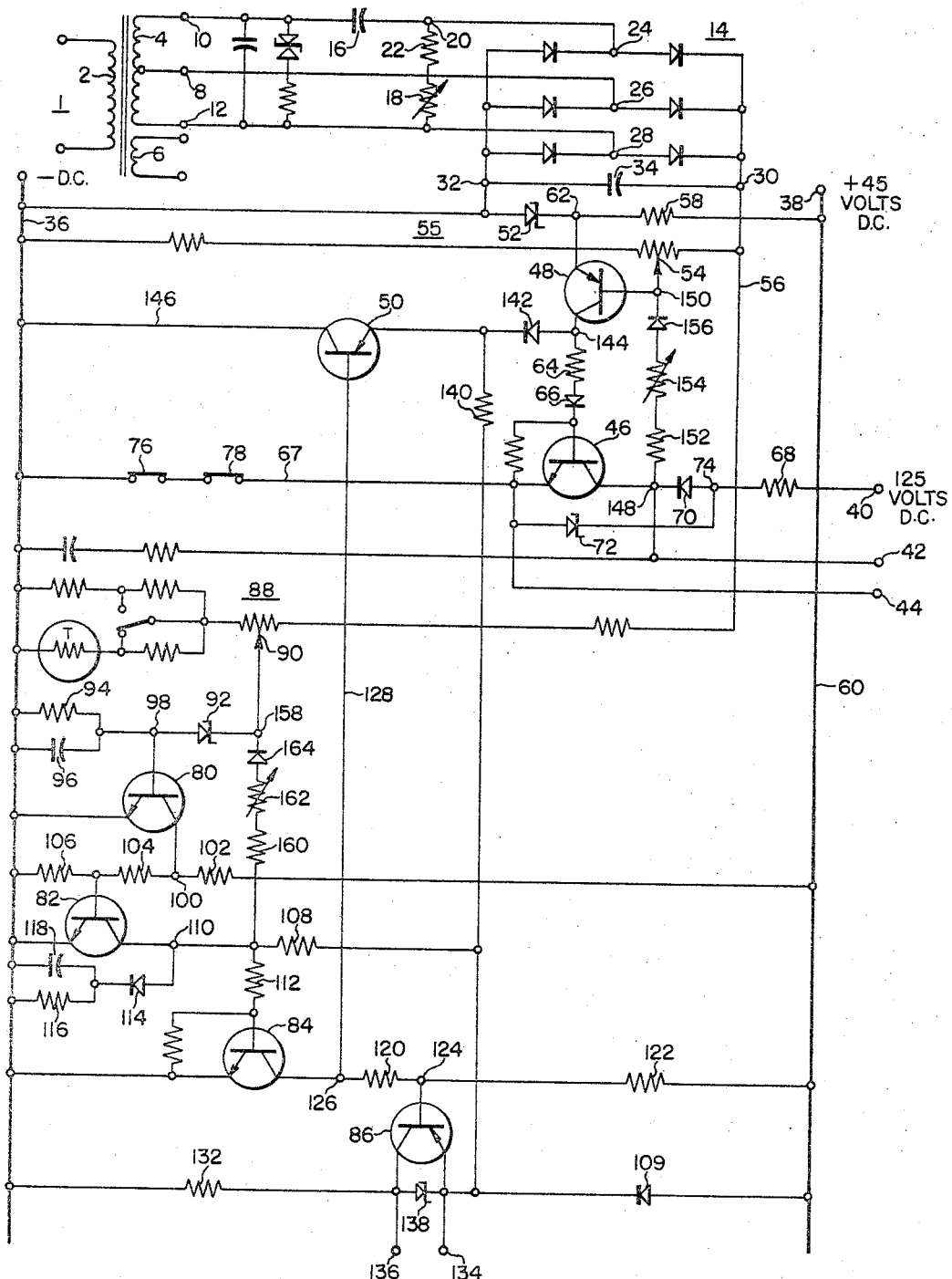

3,427,473
STATIC SWITCHING APPARATUS FOR SELECTIVELY CONTROLLING ONE OR MORE OUTPUT CIRCUITS
Conrad T. Altfather, Basking Ridge, and Herbert W. Lensner, East Orange, N.J., assignors to Westinghouse Electric Corporation, Pittsburgh, Pa., a corporation of Pennsylvania
Filed May 26, 1965, Ser. No. 458,938
U.S. Cl. 307—241   11 Claims
Int. Cl. H03k 17/60

ABSTRACT OF THE DISCLOSURE

A solid state switching apparatus actuatable in response to an increasing input voltage to alter the energized condition of a first and thereafter a second circuit; the apparatus further being operable in response to the alteration of each circuit to selectively lower the magnitudes of the input voltage which will cause the respective circuit to return to its unaltered condition and to prevent the first circuit to return to its unaltered condition before the return of the second circuit to its unaltered condition.

---

This invention relates generally to relaying apparatus and particularly to a static relaying apparatus for use in relaying protective systems.

In prior art relaying systems, a pair of electromechanical fault detecting relays are provided to establish preparatory circuits in the event that fault current is flowing through the protected line section. In normal operating practice, one of the relays is set to operate at a predetermined fault current magnitude and the other is set to operate at a fault current magnitude somewhat above the predetermined fault current magnitude at which the first relay operates. In the past, these relays have been of the electromechanical type having magnetic armatures and metallic contacts which are subject to several hazards in normal use including sticking of the armature to its backstop, poor contact action near pickup current, contact welding, and formation of a film on the contact surface. It is the purpose of this invention to replace the electromechanical fault detectors with completely static units employing semiconductors to give improved operation in performing the same functions as the mechanical counterparts without the attendant hazards. Additionally, the static fault relays have desirable features such as being faster in operation and the absence of all moving parts.

It is an object of this invention to provide an improved static relay.

It is a further object of this invention to provide such a static relay in which the ratio between pickup and dropout actuating potential may be selectively controlled.

A still further object of this invention is to provide a static counterpart to the fault detector relays wherein the pair of static relays operate in predetermined sequence.

Other objects of the invention will be apparent from the description, the appended claims and the drawing in which the single view thereof sets forth, schematically, a static relaying network embodying the invention.

Referring to the drawing by characters of reference, the numeral 1 represents generally a transformer having a primary winding 2 connectable to a variable voltage source of potential which voltage may vary in accordance with the magnitude of fault current flowing through a circuit to be protected. The transformer 1 is provided with a pair of secondary windings 4 and 6 for supplying control potentials. The alternating voltage output of the winding 6 may energize the low pass filter 10 of the copending application of Conrad T. Altfather, one of the joint applicants herein, Ser. No. 378,552, filed June 29, 1964, now U.S. Patent 3,295,019 dated December 27, 1966, for Phase Comparison Relaying Device, and assigned to the same assignee as is this application. The output of the secondary winding 4 is rectified and supplied as a variable potential unidirectional control voltage for controlling the fault detecting relays as for example the circuits controlled by the relays 16 and 18 of the above-mentioned copending Altfather application.

The transformer 1 is preferably of the type which will saturate when subjected to a predetermined maximum potential across its primary winding to thereby limit the maximum voltage obtained at the output windings 4 and 6. The winding 4 is provided with a center tap connection 8 and end connections 10 and 12. The single phase output of the winding 4 is split to provide a polyphase input supply to the full wave rectifying network 14 to reduce the amount of capacitance necessary to smooth out the rectified output. The added phase is provided by a phase shifting network which comprises a capacitor 16 and a resistor 18 connected in series between the end taps 10 and 12. The resistor 18 is preferably variable to provide an adjustment for adjusting the phase of the output voltage of the phase shifting network which is taken between the output terminal 20 and the center tap 8 of the winding 4. In order to limit the adjustment provided by the variable resistor 18, a second resistor 22 is connected in series therewith. Preferably the phase of the voltage obtained between the terminals 20 and 8 is 60° phase displace with respect to the voltage across the winding 4.

In order to provide for equal voltages, the voltage supplied directly from the winding 4 to the rectifying network 14 is taken between the mid tap 8 and the end tap 12. The polyphase output voltage from the winding 4 is applied to the input terminals 24, 26 and 28 of the full wave rectifying network 14 and the rectified output is provided at positive and negative output terminals 30 and 32. If desired, a capacitor 34 can be provided to reduce the output ripple of the polyphase rectifying network 14; however, the magnitude of the capacitor 34 should be maintained small if the output voltage between the terminals 30 and 32 is to closely follow the input voltage applied to the input winding 2.

Operating energy for the relaying network is applied between the negative direct current bus 36 and one or more positive potential terminals such as the 45 volt terminal 38 and the 125 volt terminal 40. It will be appreciated that many and various networks energized from a source of operating potential energy may be used to supply the operating energy of the relaying network.

Energization of the output terminals 42 and 44 is determined by the conductive condition of a semiconductor valve on device 46 such as a transistor, the conducting condition of which is controlled by means of semiconductor valves or devices 48 and 50 which also may be transistors. The output terminals 42 and 44 preferably are connected directly to the collector and emitter of the normally conducting transistor 46. The conduction of the transistor 48 (and consequently the energization of the output terminals 42 and 44) is controlled by a differential voltage derived between a fixed reference voltage established by a suitable switch or device 52, such as the illustrated Zener diode and an adjustable tap 54 of a voltage dividing network connected between the negative DC bus 36 and a positive bus 56. The negative and positive output terminals 30 and 32 of the rectifier 14 are respectively connected to these buses 36 and 56. The Zener diode 52 has its anode connected to the negative bus 36 and its cathode connected through a resistor 58 to the positive bus 60 energized from the input terminal 38.

The emitter of the normally conducting relaying transistor 48 is connected to the common connection 62 of the diode 52 and resistor 58 while the base is connected to the adjustable tap 54 of the voltage dividing network 55. It will be apparent that the voltage applied to control the emitter-collector conduction of the transistor 48 is the difference between the voltage established by the Zener diode 52 and that obtained between the adjustable tap 54 and the bus 36.

The emitter collector circuit of the transistor 48 extends from the common connection or terminal 62, emitter to collector within the transistor 48 through a resistor 64, a diode 66 and base to emitter through the transistor 46 and conductor 67 to the bus 36. When base current flows in the transistor 46, it conducts collector to emitter from the input terminal 40 through a resistor or current limiting device 68, diode 70, collector to emitter of the transistor 48 and conductor 67 to the bus 36. When so conducting, substantially no potential drop exists between the collector and emitter of the transistor 46 and no output voltage will appear between the output terminals 42 and 44.

In order to provide a limit to the output voltage which can appear between the output terminals 42 and 44 when the transistor 46 is nonconducting, as will be described below, a current conducting voltage maintaining device or Zener diode 72 is connected in shunt between the emitter of the transistor 46 and the common connection 74 of the resistor 68 and diode 70. If desired, switches 76 and 78 may be connected in series in the conductor 67 which may be opened in any desired manner or for any desired purpose to insure continued energization of the output terminals 42 and 44. The foregoing described relaying network performs the FD-1 functions of the relay 16 of the said Altfather application.

The FD-2 function performed by the relay 18 of the said Altfather application is performed by semiconductor or solid state devices or valves 80, 82, 84 and 86 which, like the devices or valves 46, 48 and 50, may be and are shown as transistors. The conducting condition of the transistor 80 is controlled by a potential derived from a voltage dividing network 88 connected between the buses 56 and 36. An adjustable output tap 90 of the network 88 adjust the voltage at the winding 2 which causes the transistor 80 to conduct. This tap 90 is connected through a voltage actuated switch 92 such as the illustrated Zener diode and a resistor 94 to the negative bus 36. A capacitor 96 is connected in shunt with the resistor 94. The base of the transistor 80 is connected to the common connection 98 between the diode 92 and resistor 94, the emitter is connected directly to the negative bus 36 and the collector is connected to the common terminal 100 of a plurality of series connected resistors 102, 104 and 106 connected between the positive bus 60 and the negative bus 36. The base of the transistor 82 is connected to the common connection of the resistors 104 and 106 and the emitter is connected to the negative bus 36. The collector of the transistor 82 is connected through a conductor 110, a resistor 108 and a diode 109 to the positive bus 60. The conductor 110 which connects the resistor 108 to the collector of the transistor 82 is connected to the negative bus 36 through a diode 114 and a resistor 116. A capacitor 118 is connected in shunt with the resistor 116.

The base of the transistor 84 is connected through a resistor 112 to the conductor 110, the emitter thereof is connected directly to the negative bus 36 and the collector is connected through resistors 120 and 122 to the positive bus 60. The base of the transistor 86 is connected to the common connection 124 of the resistors 120 and 122 while the base of the transistor 50 is connected to the common connection 126 of the resistor 120 and the collector of the transistor 84 by means of conductor 128. The emitter of the transistor 86 is connected to the positive bus 60 through the diode 109 while the collector thereof is connected through a resistor 132 to the negative bus 36. Output terminals 134 and 136 are connected to the emitter and base respectively of the transistor 86. A voltage limiting Zener diode 138 shunts the terminals 134 and 136 to limit the output voltage. The emitter of the transistor 50 is connected to the common connection between the resistor 108 and the diode 109 through a resistor 140 and through a diode 142 to the common terminal 144 of the resistor 64 and the collector of the transistor 48. The collector of the transistor 50 is connected through a conductor 146 to the negative bus 36.

It is believed that the remainder of the details of construction may best be set forth by a description of operation of the invention which is as follows: When the voltage applied to the primary winding 2 of the transformer 1 is below a critical magnitude, the voltage appearing between the adjustable tap 54 of the voltage dividing network 55 and the negative bus 36 will be less than the voltage established across the Zener diode 52 and base drive current will flow from the common connection 62, emitter to base in the transistor 48 to maintain the transistor 48 conducting. This conduction causes base drive current to flow from the common connection 62, emitter to collector in the transistor 48, resistor 64, diode 66 and base to emitter in the transistor 46 to render the transistor 46 normally conducting to maintain a low resistant shunt between the output terminals 42 and 44.

The voltage appearing between the output tap 90 of the voltage dividing network 88 and the negative bus 36 is less than the breakover voltages of the Zener diode 92 and the transistor 80 is held blocked by the absence of base drive current thereto. With the transistor 80 blocked, base drive current for the transistor 82 flows from the bus 60 through the resistor 102 and 104, base to emitter in the transistor 82 to the negative bus 36 whereby the transistor 82 is normally maintained conducting to shunt the base emitter circuit of the transistor 84. This maintains the transistor 84 in a nonconducting state. Since the transistor 84 is not conducting, the potential of the common connection 124 will be substantially that of the bus 60 and no base drive current will flow emitter to base in the transistor 86 which remains in a nonconducting condition. With the transistor 86 nonconducting, current flows from the positive bus 60 through diode 109, the Zener diode 138 and resistor 132 to the negative bus 36 to establish a positive to negative potential at the output terminals 134 and 136. The lack of conduction in the transistor 84 also maintains the common connection 126 at a potential substantially equal to that of the bus 60 and no base drive current flows in the transistor 50. The transistor 50 remains nonconducting and ineffective to shunt the base drive current from the normally conducting transistor 46.

Upon an increase in voltage applied to the primary winding 2 of the transformer 1 to a predetermined first critical value such as might be caused by the occurrence of a fault in the transmission line, the output voltage between the output terminals 30 and 32 of the rectifying network 14 will increase to the point wherein the potential of the adjustable tap 54 is elevated with respect to that of the bus 36 to a value which is greater than that which appears across the Zener diode 52. When this occurs, the transistor 48 becomes nonconducting and interrupts the flow of base current to the transistor 46. This causes the transistor 46 to become nonconducting and a potential is established between the output terminals 42 and 44 by the current which then flows from the input terminal 40 through resistor 68, diode 70, Zener diode 72, conductor 67 and switches 76 and 78 to the negative bus 36.

If the voltage applied to the transformer 1 increases to a predetermined second critical voltage, the potential of the output tap 90 of the voltage dividing network 88 will increase in potential, with respect to that of the negative bus 36, sufficiently to cause the Zener diode 92 to break over and energize the resistance-capacitor network 94–96.

The potential of the connector 98 increases and base drive current flows in the transistor 80, through an obvious circuit, which causes it to conduct collector to emitter and connect the common terminal 100 to the bus 36. This terminates further base current flow in the transistor 82 which thereupon becomes nonconducting and opens the shunt circuit between the conductor 110 and the negative bus 36. When this occurs, the potential of the conductor 110 rises and base drive current flows therefrom through the resistor 112 and the base emitter circuit of the transistor 84 to the negative bus 36 to render transistor conducting. Current then flows from the common connection 126, collector to emitter in the transistor 84 to the negative bus 36 to lower the potential of the common connection 126 and of the common connection 124.

The reduction in potential of the connections 124 and 126 lowers the potential of the base of the transistors 50 and 86 thereby initiating the flow of base drive current from the positive bus 60 through diode 109, resistor 140, emitter to base of the transistor 50, conductor 128 and collector to emitter of the transistor 84 to the bus 36. This renders the transistor 50 conductive without any present effect since at this time there is no positive potential applied to the common terminal 144 but does establish a preliminary circuit to prevent reconduction of the transistor 46 until the rendering of the transistors 84 and 86 nonconducting and the rendering of the output terminals 134 and 136 energized. The lowering of the potential of the base of the transistor 86 causes base current to flow from the bus 60 through diode 109, emitter to base in the transistor 86, resistor 120 and collector to emitter of the transistor 84 to the negative bus 36 thereby rendering the transistor 86 conducting to conduct current from the bus 60 through the diode 109, emitter to collector of the transistor 86 and resistor 132 to the negative bus 36. This effectively short circuits the output terminals 134 and 136 thereby removing the potential applied thereto during the interval that the transistor 86 was conducting.

If the potential at the winding 2 remains above the first critical magnitude the transistor 48 will remain blocked and irrespective of the rendering of the transistor 50 blocked by the reconduction of the transistor 84, the terminals 42 and 44 will remain energized.

When the relaying apparatus is used in connection with protective relaying systems, such as that shown in the copending application of Altfather, opening of a control circuit breaker to isolate a line section which is faulted may well result in a rapid reduction in the potential applied to the transformer 1 so that the value of the potential applied to the winding 2 is much less than the first critical value which is required to render the transistor 48 blocked. In such an event it could happen that the transistor 46 could conduct and deenergize the output terminals 42 and 44 prior to the blocking of the transistor 86 to establish an output voltage across the terminals 134 and 136. This is prevented from occurring as long as the transistor 50 is maintained conductive. Should the transistor 48 conduct prior to the termination of conduction through the transistor 84, the conductive transistor 50 would conduct to establish a shunt circuit between the common terminal 144 and the emitter of the transistor 46 to prevent the transistor 46 from being supplied with base drive current and it would remain nonconducting even though the transistor 48 should conduct. This insures a reenergization of the terminals 134 and 136 prior to the deenergization of the terminals 42 and 44.

In order to prevent hunting and to provide an adjustment to adjust the differential potential of the output of the rectifying nework 14 which will interrupt and establish conduction through the transistors 48 and 46 to energize and deenergize the output terminals 42 and 44, a feedback network is provided. This network extends from the common terminal 148 of the diode 70 and collector of the transistor 46 to a common terminal 150 of the adjustable tap 54 and the base of the transistor 48. This feedback network comprises a fixed resistor 152, a variable resistor 154 and a diode 156. When the transistor 46 is conducting, the potential of the common terminal 148 is substantially that of the negative bus and no potential is supplied therefrom to the common terminal 150 and the potential at which the transistor 48 blocks is primarily controlled by the tap 54.

When, however, the transistor 46 is blocked, the potential of the common terminal 148 rises to a value with respect to the negative bus 36 as determined by the Zener diode 72. This value is such that current will flow through the current regulating means or resistors 152 and 154 and the diode 156 to raise the potential of the common terminal 150 a predetermined amount above the potential which it would assume if it were controlled solely by the adjustable tap 54. This establishes a new first critical potential of the rectifying network 14 somewhat below that which caused the transistor 48 to block to which the input potential at the winding 2 must be reduced before the transistor 48 will again conduct. The adjustment of the resistor 154 controls the amount of this feedback voltage and consequently the differential voltage of the transistor 48.

Similarly a feedback circuit for the transistor 80 is provided between the common connection 110 and a common tap 158 between the output tap 90 and the Zener diode 92. This circuit, like the other feedback circuit, comprises a fixed resistor 160, a variable resistor 162 and a diode 164, and operates to provide a differential voltage in accordance with the conducting condition of the transistor 82 to the base emitter circuit of the transistor 80 in substantially the same manner as described above in connection with the feedback circuit from the transistor 46 to the transistor 48.

Although the invention has been described with reference to a single embodiment thereof, numerous modifications are possible and it is desirable to cover all modifications falling within the spirit and scope of the invention.

What is claimed and is desired to be secured by United States Letters Patent is as follows:

1. A switching network comprising a pair of input terminals adapted to be connected to a source of control potential, an operating energy supply means adapted to be connected to a source of operating energy, a voltage dividing network connected between said pair of input terminals, a plurality of electric valves, each said valve having a main current path and a control circuit for controlling at least the initiation of current flow through its associated said main path, a first circuit connecting said control circuit of said first valve across said supply means and including a portion of said network, a second circuit connecting said main path of said first valve across said supply means, said second circuit including said control circuit of a second of said valves, a third circuit connecting said main path of said second valve across a source of energy, and a fourth circuit connecting said third circuit to said control circuit of said first valve for supplying a feedback signal to said first valve.

2. A switching network comprising first and second pairs of terminals, a first voltage dividing network connected between said first pair of terminals, said network being provided with an output terminal having a potential intermediate that of said terminals of said first pair of terminals, a plurality of electric valves, each said valve having a main current path and a control circuit for controlling at least the initiation of current flow through its associated said main path, a first circuit connecting said control circuit of said first valve between said second pair of terminals, a second circuit connecting said main path of said first valve between said second pair of terminals, said second circuit including said control circuit of a second of said valves, said main path of said second valve being adapted to be energized from a source of operating potential, a third circuit connecting said main path of said second valve to said output terminal, means connecting said main path of a third of said valves in shunt circuit with said control circuit of said second valve, a second voltage dividing network connected between said first pair of terminals, said second network being provided with a second output terminal having a potential intermediate that of said terminals of said first pair of terminals, a fourth circuit connecting said control circuit of a fourth of said valves between said second output terminal and one of said terminals of said first pair of terminals, a fifth circuit connecting said main path of said fourth valve between said second pair of terminals, a sixth circuit connecting said main path of a fifth of said valves in shunt circuit with said control circuit of a sixth of said valves, a seventh circuit connecting said control circuit of said fifth valve between said second pair of terminals, an eighth circuit connecting said main path of said fourth valve in shunt circuit with said control circuit of said fifth valve, a ninth circuit connecting said sixth circuit to said second output terminal, a tenth circuit connecting said control circuit of said sixth valve between said seond pair of terminals, an eleventh circuit connecting said main path of a seventh of said valves between said second pair of terminals, a twelfth circuit connecting said control circuit of said seventh valve and said main path of said sixth valve in series circuit between said second pair of terminals, and a thirteenth circuit connecting said control circuit of said third valve in series circuit with said main path of said sixth valve between said second pair of terminals.

3. A relaying network for association with a source of variable magnitude alternating potential, a pair of control potential input terminals adapted to be energized from said source, a phase splitting network connected to said terminals, a rectifying network having a first output terminal of a first polarity and a second output terminal of a second polarity, means connecting said input terminals and said splitting network to said rectifying network whereby the potential across said output terminals is a unidirectional potential, a source of unidirectional potential operating energy having a terminal of said first polarity, said terminals of said first polarity being connected to a common bus, a plurality of impedance elements, a voltage limiting element, a first circuit connecting a first of said impedance elements and said voltage limiting element across said source of operating energy, said limiting element being intermediate said first impedance element and said bus, a second circuit connecting a second of said impedance elements between said output terminals of said rectifying network, said second element having an intermediate tap, a plurality of transistors, each said transistor having a pair of main electrodes and a control electrode, means connecting said control electrode of a first of said transistors to said intermediate tap, means connecting one of said main electrodes of said first transistor to said first circuit intermediate its said elements, a voltage dropping element, a third circuit connecting said dropping element between the other of said main electrodes of said first transistor and said control electrode of a second of said transistors, a fourth circuit connecting a third of said impedance elements in series with said main electrodes of said second transistor across a source of operating energy, said main electrodes of said second transistor being intermediate said third impedance element and said bus, a fifth circuit connecting a fourth of said impedance elements between said control electrode of said first transistor and said fourth circuit intermediate said third impedance element and said second transistor, means connecting said main electrodes of a third of said transistors between said control electrode and one of said main electrodes of said second transistor, and circuit means connected to said control circuit of said third transistor.

4. A relaying network for association with a source of variable magnitude alternating potential, a pair of control potential input terminals adapted to be energized from said source, a phase splitting network connected to said terminals, a rectifying network having a first output terminal of a first polarity and a second output terminal of a second polarity, means connecting said input terminals and said splitting network to said rectifying network whereby the potential across said output terminals is a unidirectional potential, a source of unidirectional potential operating energy having a terminal of said first polarity and at least a pair of terminals of said second polarity, one of said pairs of terminals being of lesser potential with respect to said first polarity than the other of said pairs of terminals, said terminals of said first polarity being connected to a common bus, a plurality of impedance elements, a voltage limiting element, a first circuit connecting a first of said impedance elements and said voltage limiting element between said bus and said one terminal, said limiting element being intermediate said first impedance element and said bus, a second circuit connecting a second of said impedance elements between said bus and said second output terminal of said rectifying network, said second element having an intermediate tap, a plurality of transistors, each said transistor having a pair of main electrodes and a control electrode, means connecting said control electrode of a first of said transistors to said intermediate tap, means connecting one of said main electrodes of said first transistor to said first circuit intermediate its said elements, a voltage dropping element, a third circuit connecting said dropping element between the other of said main electrodes of said first transistor and said control electrode of a second of said transistors, a fourth circuit connecting a third of said impedance elements in series with said main electrodes of said second transistor between said bus and said other terminal of said source of operating energy, said main electrodes of said second transistor being intermediate said third impedance element and said bus, a fifth circuit connecting a fourth of said impedance elements between said control electrode of said first transistor and said fourth circuit intermediate said third impedance element and said second transistor, and a sixth circuit connecting one of said main electrodes of a third of said transistors to a terminal of said source which is at said second polarity and connecting said control electrode of said third transistor to said bus, said sixth circuit including switch means connected therein to control the energization of said sixth circuit and thereby conduction between said main electrodes of said third transistor.

5. A relaying network for association with a source of variable magnitude alternating potential, a pair of control potential input terminals adapted to be energized from said source, a phase splitting network connected to said teminals, a rectifying network having a first output terminal of a first polarity and a second output terminal of a second polarity, means connecting said input terminals and said splitting network to said rectifying network whereby the potential across said output terminals is a unidirectional potential, a source of unidirectional potential operating energy having a terminal of said first polarity, said terminals of said first polarity being connected to a common bus, a plurality of impedance elements, a voltage limiting element, a first circuit connecting a first of said impedance elements and said voltage limiting element across said source of operating energy, said limiting element being intermediate said first impedance element and said bus, a second circuit connecting a second of said impedance elements between said output terminals of said rectifying network, said second element having an intermediate tap, a plurality of transistors, each said transistor having a pair of main electrodes and a control electrode, means connecting said control electrode of a first of said transistors to said intermediate tap, means connecting one of said main electrodes of said first transistor to said first circuit intermediate its said elements, a voltage dropping element, a third circuit connecting said dropping element between the other of said main electrodes of said first transistor and said control electrode of a second of said transistors, a fourth circuit connecting a third of said impedance elements in series with said main electrodes of said second transistor across said source of operating energy, said main electrodes of said second transistor being intermediate said third impedance element and said bus, a fifth circuit connecting a fourth of said impedance elements between said control electrode of said first transistor and said fourth circuit intermediate said third impedance element and said second transistor, a sixth circuit connecting a fifth of said impedance elements between said output terminals of said rectifying network, said fifth impedance element having an intermediate tap, a voltage actuated breakover device, a seventh circuit connecting said control electrode of a third of said transistors in series with said breakover device to said intermediate tap of said fourth element and one of said main electrodes of said third transistor to said bus, said breakover device being intermediate said control electrode of said third transistor and said intermediate tap of said fifth impedance element, an eighth circuit connecting a sixth of said impedance elements in series with said main electrodes of said third transistor across said source of operating energy, a ninth circuit connecting a seventh of said impedance elements in series with said main electrodes of a fourth of said transistors and with said control electrode and one of said main electrodes of a fifth of said transistors across said source of operating energy, and a tenth circuit interconnecting said control electrode of said fourth transistor to said seventh circuit.

6. A relaying network for association with a source of variable magnitude alternating potential, a pair of control potential input terminals adapted to be energized from said source, a phase splitting network connected to said terminals, a rectifying network having a first output terminal of a first polarity and a second output terminal of a second polarity, means connecting said input terminals and said splitting network to said rectifying network whereby the potential across said output terminals is a unidirectional potential, a source of unidirectional potential operating energy having a terminal of said first polarity, said terminals of said first polarity being connected to a common bus, a plurality of impedance elements, a voltage limiting element, a first circuit connecting a first of said impedance elements and said voltage limiting element across source of operating energy, said limiting element being intermediate said first impedance element and said bus, a second circuit connecting a second of said impedance elements between said output terminals of said rectifying network, said second element having an intermediate tap, a plurality of transistors, each said transistor having a pair of main electrodes and a control electrode, means connecting said control electrode of a first of said transistors to said intermediate tap, means connecting one of said main electrodes of said first transistor to said first circuit intermediate its said elements, a voltage dropping element, a third circuit connecting said dropping element between the other of said main electrodes of said first transistor and said control electrode of a second of said transistors, a fourth circuit connecting a third of said impedance elements in series with said main electrodes of said second transistor across said source of operating energy, said main electrodes of said second transistor being intermediate said third impedance element and said bus, a fifth circuit connecting a fourth of said impedance elements between said control electrode of said first transistor and said fourth circuit intermediate said third impedance element and said second transistor, a sixth circuit connecting a fifth of said impedance elements between said output terminals of said rectifying network, said fifth impedance element having an intermediate tap, a voltage actuated breakover device, a seventh circuit connecting said control electrode of a third of said transistors in series with said breakover device to said intermediate tap of said fourth element and one of said main electrodes of said third transistor to said bus, said breakover device being intermediate said control electrode of said third transistor and said intermediate tap of said fifth impedance element, an eighth circuit connecting a sixth of said impedance elements in series with said main electrodes of said third transistor across said source of operating energy, a ninth circuit connecting a seventh of said impedance elements in series with said main electrodes of a fourth of said transistors across said source of operating energy, a tenth circuit connecting an eighth of said impedance elements between said intermediate tap of said fifth impedance element and said ninth circuit intermediate said fourth transistor and said seventh impedance element, circuit means connecting said control electrode of a fifth of said transistors to said bus, said last-named means including switch means, said last-named switch means including a control circuit, and means connecting said last-named control circuit to said seventh circuit for actuation by said seventh circuit.

7. A relaying network for association with a source of variable magnitude alternating potential, a pair of control potential input terminals adapted to be energized from said source, a phase splitting network connected to said terminals, a rectifying network having a first output terminal of a first polarity and a second output terminal of a second polarity, means connecting said input terminals and said splitting network to said rectifying network whereby the potential across said output terminals is a unidirectional potential, a source of unidirectional potential operating energy having a terminal of said first polarity, said terminals of said first polarity being connected to a common bus, a plurality of impedance elements, a voltage limiting element, a first circuit connecting a first of said impedance elements and said voltage limiting element across said source of operating energy, said limiting element being intermediate said first impedance element and said bus, a second circuit connecting a second of said impedance elements between said output terminals of said rectifying network, said second element having an intermediate tap, a plurality of transistors, each said transistor having a pair of main electrodes and a control electrode, means connecting said control electrode of a first of said transistors to said intermediate tap, means connecting one of said main electrodes of said first transistor to said first circuit intermediate its said elements, a voltage dropping element, a third circuit connecting said dropping element between the other of said main electrodes of said first transistor and said control electrode of a second of said transistors, a fourth circuit connecting a third of said impedance elements in series with said main electrodes of said second transistor across said source of operating energy, said main electrodes of said second transistor being intermediate said third impedance element and said bus, a fifth circuit connecting a fourth of said impedance elements between said control electrode of said first transistor and said fourth circuit intermediate said third impedance element and said second transistor, a sixth circuit connecting a fifth of said impedance elements between said output terminals of said rectifying network, said fifth impedance element having an intermediate tap, a voltage actuated breakover device, a seventh circuit connecting said control electrode of a third of said transistors in series with said breakover device to said intermediate tap of said fourth element and one of said main electrodes of said third transistor to said bus, said breakover device being intermediate said control electrode of said third transistor and said intermediate tap of said fifth impedance element, an eighth circuit connecting a sixth of said impedance elements in series with said main electrodes of said third transistor across said source of operating energy, a ninth circuit connecting a seventh of said impedance elements in series with said main electrodes of a fourth of said transistors across said source of operating energy, a tenth circuit connecting said control circuit of said fourth transistor in shunt circuit with said main electrodes of said third transistor, an eleventh circuit connecting an eighth of said impedance elements in series circuit with said main electrodes of a fifth of said transistors across said source of operating energy, a twelfth circuit connecting a ninth of said impedance elements in series with said main electrodes of a sixth of said transistors across said source of operating energy, means connecting said control electrode of a seventh of said transistors and said control electrode of said sixth transistor to said eleventh circuit intermediate said eighth impedance element and said fifth transistor, and circuit means connecting said main electrodes of said seventh transistor between said control electrode of said second transistor and said bus, and a second voltage limiting element connected in shunt with said main electrodes of said sixth transistor.

8. In a switching network, first and second terminals adapted to be energized from a source of control potential, means including a third terminal adapted to be energized from a source of operating energy, a plurality of electric valves, each said valve having a main current path and a control circuit controlling at least the initiation of current flow through its associated said main path, a plurality of impedance elements, a breakover device operable to conduct effectively solely subsequent to the application thereto of a predetermined minimum control potential, a first circuit connecting a first of said impedance elements between said first and said second terminals, said first impedance element having an intermediate tap, a second circuit connecting said breakover device in series circuit with a second of said impedance elements between said intermediate tap and said first terminal, a third circuit connecting said control electrode and one of said main electrodes of a first of said valves across said second impedance element, a fourth circuit connecting a third of said impedance elements in series with said main path of said first valve across said source of operating energy, a fifth circuit connecting a fourth of said impedance elements in series with said main path of a second of said valves across said source of operating energy, a feedback circuit connecting a fifth of said elements between said first impedance element and said fifth circuit intermediate said second valve and said fourth impedance element, switch means having an output circuit and a control circuit controlling the conductive condition of its said output circuit, and means connecting said control circuit of said switch means to said fifth circuit whereby the conducting condition of said output circuit of said switch means is controlled as a function of the conductive condition of said fifth circuit.

9. A static switching network comprising control potential input means adapted to be energized from a source of control potential, operating potential input means adapted to be energized from a source of operating energy, a first circuit energized from said control potential input means and having a pair of control potential output terminals, a voltage establishing means, a second circuit energized from said operating potential input means and including said voltage establishing means, said second circuit having a pair of reference potential output terminals energized with a potential established by said establishing means, first and second semiconductor devices, each said device having a main current path and a control circuit for controlling at least the initiation of current flow through its associated said main path, a third circuit connecting said control circuit of said first device in circuit with said pairs of output terminals whereby said control circuit of said first device is energized solely when the voltage supplied to said voltage means is greater than a predetermined value, a fourth circuit connecting said main path of said first device between said operating potential input means and to said control circuit of said second device whereby the conductive condition of said main path of said first device controls the energized condition of said control circuit of said second device, a first impedance element, a fifth circuit connecting said main path of said second device in series circuit with said impedance element across said operating potential input means, and a feedback circuit connecting said fifth circuit to said third circuit to supply a third potential to said third circuit dependent upon the conducting condition of said main path of said second device.

10. A static switching network comprising, control potential input means adapted to be energized from a source of control potential, operating potential input means adapted to be energized from a source of operating energy, a first circuit energized from said control potential input means and having a pair of control potential output terminals, a voltage actuated switch normally maintained in open circuit, said switch being operable to conduct as a consequence of the application of a predetermined minimum critical magnitude of potential being applied thereto, a plurality of impedance elements, a second circuit connecting a first of said impedance elements and said switch in series circuit between said control potential output terminals, a plurality of semiconductor devices, each said device having a main current path and a control circuit for controlling at least the initiation of current flow through its associated said main path, a third circuit connecting said control circuit of a first of said devices across said first impedance element, a fourth circuit connecting said main path of said first device and a second of said impedance elements across said operating potential input means, a fifth circuit connecting said main path of a second of said devices in series with a third of said impedance elements across said operating potential input means, a sixth circuit connecting said control circuit of said second device in shunt with said main path of said first device, and feedback circuit means connecting said first and third impedance elements and said voltage switch in series circuit across said operating potential input means.

11. A static switching network comprising, control potential input means adapted to be energized from a source of control potential, operating potential input means adapted to be energized from a source of operating energy, means energized from said source of operating energy and determining a source of reference potential, a plurality of semiconductor devices, each said device having a main path and a control circuit for controlling at least the initiation of current flow through its associated said main path, a plurality of impedance elements, a first circuit connecting said source of reference voltage in series opposition with at least a portion of said control potential means across said control circuit of a first of said devices, a second circuit means connecting said control circuit of a second of said devices to said main path of said first device for controlling the energization of said second device by said first device, a third circuit connecting a first of said impedance elements in series circuit with said main path of said second device across an operating energy supply means, a fourth circuit connecting said main path of a third of said device in shunt circuit with said control circuit of said second device, a voltage actuated switch normally maintained in open circuit condition, said switch being operable to conduct as a consequence of the application of a predetermined minimum critical magnitude of potential being applied thereto, a fifth circuit connecting a second of said impedance elements and said switch in series circuit across at least a portion of said control potential means, a sixth circuit connecting said control circuit of a fourth of said devices across said second impedance element, a seventh circuit connecting said main path of said fourth device and a third of said impedance elements across said operating potential input means, an eighth circuit connecting said main path of a fifth of said devices in series with a fourth of said impedance elements across said operating potential input means, a ninth circuit connecting said control circuit of said fifth device in shunt with said main path of said fourth device, feedback circuit means connecting said second and fourth impedance elements and said voltage switch in series circuit across said operating potential input means, a tenth circuit connecting said main path of a sixth of said devices in series with a fifth of said impedance elements across said operating potential input means, an eleventh circuit connecting said main path of said fifth device in shunt with said control circuit of said sixth device, and a twelfth circuit connecting said control circuit of said third device in series circuit with said main path of said sixth device across said operating potential input means.

References Cited

UNITED STATES PATENTS

| | | | |
|---|---|---|---|
| 2,986,659 | 5/1961 | Ioakimidis | 307—88.5 |
| 3,083,303 | 3/1963 | Knowles et al. | 307—88.5 |
| 3,151,289 | 9/1964 | Harpley | 307—88.5 X |
| 3,233,115 | 2/1966 | Chou | 307—88.5 |
| 3,260,920 | 7/1966 | Shoemaker | 307—88.5 X |
| 3,286,030 | 11/1966 | Puckett et al. | 307—88.5 X |

ARTHUR GAUSS, *Primary Examiner.*

D. D. FORRER, *Assistant Examiner.*

U.S. Cl. X.R.

307—253, 255